US006209646B1

(12) United States Patent
Reddy et al.

(10) Patent No.: US 6,209,646 B1
(45) Date of Patent: Apr. 3, 2001

(54) CONTROLLING THE RELEASE OF CHEMICAL ADDITIVES IN WELL TREATING FLUIDS

(75) Inventors: Baireddy R. Reddy; Ronald J. Crook; Jiten Chatterji; Bobby J. King, all of Duncan; Dennis W. Gray, Comanche; Russell M. Fitzgerald, Waurika; Ronald J. Powell; Bradley L. Todd, both of Duncan, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/295,716

(22) Filed: Apr. 21, 1999

(51) Int. Cl.$^7$ .................................................. E21B 33/13
(52) U.S. Cl. .......................................... 166/300; 166/293
(58) Field of Search ................................... 166/292–295, 166/308, 300

(56) References Cited

U.S. PATENT DOCUMENTS

| | | | |
|---|---|---|---|
| 3,163,219 | 12/1964 | Wyant et al. | 166/42 |
| 3,766,984 | 10/1973 | Nimerick | 166/294 |
| 3,952,741 | 4/1976 | Baker | 128/260 |
| 3,992,317 | 11/1976 | Brichard . | |
| 4,182,417 | 1/1980 | McDonald et al. | 166/295 |
| 4,202,795 | 5/1980 | Burnham et al. . | |
| 4,211,668 | 7/1980 | Tate . | |
| 4,259,205 | 3/1981 | Murphey . | |
| 4,343,363 | 8/1982 | Norton et al. | 166/281 |
| 4,451,387 | 5/1984 | Tai . | |
| 4,456,067 | 6/1984 | Pinner, Jr. | 166/279 |
| 4,506,734 | 3/1985 | Nolte | 166/308 |
| 4,532,123 | 7/1985 | Gardner | 424/21 |
| 4,560,486 | 12/1985 | Hinkel . | |
| 4,564,070 | 1/1986 | Norton | 166/295 |
| 4,604,218 | 8/1986 | Dawson . | |
| 4,610,795 | 9/1986 | Norris et al. . | |
| 4,624,795 | 11/1986 | Dawson et al. . | |
| 4,670,166 | 6/1987 | McDougall et al. . | |
| 4,671,972 | 6/1987 | Schobel et al. | 427/213 |
| 4,693,321 | 9/1987 | Royer | 137/13 |
| 4,741,401 | 5/1988 | Walles et al. | 166/300 |
| 4,756,844 | 7/1988 | Walles et al. . | |
| 4,770,796 | 9/1988 | Jacobs . | |
| 4,919,209 | 4/1990 | King | 166/300 |
| 4,923,753 | 5/1990 | Walles et al. | 428/402.24 |
| 5,102,558 | 4/1992 | McDougall et al. | 252/8.551 |
| 5,110,486 * | 5/1992 | Manalastas et al. | 252/8.551 |
| 5,135,577 | 8/1992 | Brothers | 106/724 |
| 5,151,131 * | 9/1992 | Burkhalter et al. | 106/822 |
| 5,159,980 | 11/1992 | Onan et al. | 166/294 |
| 5,164,099 | 11/1992 | Gupta et al. . | |
| 5,187,011 | 2/1993 | Manalastas et al. | 428/402.24 |
| 5,188,654 | 2/1993 | Manalastas et al. | 71/28 |
| 5,192,615 | 3/1993 | McDougall et al. | 428/402.24 |
| 5,224,544 | 7/1993 | Tjon-Joe-Pin et al. | 166/295 |
| 5,293,938 | 3/1994 | Onan et al. | 166/293 |
| 5,370,184 | 12/1994 | McDougall et al. | 166/278 |
| 5,373,901 | 12/1994 | Norman et al. | 166/300 |
| 5,437,331 | 8/1995 | Gupta et al. | 166/300 |
| 5,588,488 | 12/1996 | Vijn et al. | 166/293 |
| 5,604,186 | 2/1997 | Hunt et al. | 507/204 |

FOREIGN PATENT DOCUMENTS

| | | | |
|---|---|---|---|
| 0 193 369 A2 | 3/1986 | (EP) | E21B/37/06 |
| WO 98/40606 | 9/1998 | (WO) | E21B/43/25 |
| WO 99/61747 | 12/1999 | (WO) | E21B/43/25 |
| WO 99/63199 | 12/1999 | (WO) | E21B/43/26 |

OTHER PUBLICATIONS

SPE Paper No. CIM/SPE 90–89 entitled: Encapsulated Breaker for Aqueous Polymeric Fluids by M.T. King et al.; pp. 89–91 through 89–97, presented at the International Technical Meeting in Calgary, Jun. 10–13, 1990.

SPE Paper No. 16900 entitled: An Evaluation of the Effects of Environmental Conditions and Fracturing Fluids Upon the Long–Term Conductivity of Proppants by G.S. Penny; pp. 229 through 244, presented at the 62$^{nd}$ Annual Technical Conference and Exhibition of the Society of Professional Engineers In Dallas, TX, Sep. 27–30, 1987.

SPE Paper No. 16901 entitled: Fracturing Treatment Design Improved By Conductivity Measurements Under In–Situ Conditions by M.A. Parker et al; pp. 245 through 255, presented at the 62$^{nd}$ Annual Technical Conference and Exhibition of the Society of Professional Engineers In Dallas, TX, Sep. 27–30, 1987.

SPE Paper No. 17541 entitled: Accurate Design of Fracturing Treatment Requires Conductivity Measurements at Simulated Reservoir Conditions, by B.W. McDaniel et al; pp. 541 through 549, presented at the SPE Rocky Mountain Regional Meeting, Casper, Wyoming, May 11–13, 1988.

* cited by examiner

*Primary Examiner*—David Bagnell
*Assistant Examiner*—Zakiya Walker
(74) *Attorney, Agent, or Firm*—Craig W. Roddy; C. Clark Dougherty, Jr.

(57) ABSTRACT

Methods of controlling the rates of release of chemical additives into treating fluids are provided by the present invention. The methods are basically comprised of causing a chemical additive in liquid form to be absorbed into a porous solid material whereby the chemical additive is encapsulated thereby and when the resulting encapsulated chemical additive is combined with the treating fluid, the chemical additive is slowly released into the treating fluid. After being encapsulated, the liquid chemical additive is combined with the treating fluid and the treating fluid containing the encapsulated chemical additive is introduced into a well.

26 Claims, No Drawings

CONTROLLING THE RELEASE OF CHEMICAL ADDITIVES IN WELL TREATING FLUIDS

BACKGROUND OF THE INVENTION

1. Field of the Invention

The present invention relates to well treating fluids such as completion and production stimulation fluids, and more particularly, to methods of controlling the rates of release of liquid chemical additives in well treating fluids.

2. Description of the Prior Art

Hydraulic cement slurries are commonly utilized in primary well cementing operations whereby pipe strings such as casings and liners are cemented in well bores. In performing primary cementing, a cement slurry is pumped into the annular space between the walls of the well bore and the exterior surfaces of the pipe string disposed therein. The cement slurry is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

A variety of chemical additives are utilized in cement slurries used for carrying out primary cementing and remedial cementing operations in wells. Examples of such additives include cement slurry set accelerators, cement slurry set retarders, cement slurry fluid loss control additives, cement slurry dispersants and the like. While the chemical additives utilized in cement slurries function to produce desired results, problems are often encountered as a result of the chemical additives producing the results too quickly. For example, in cementing pipe strings in subterranean formations having low temperatures, the cement slurry often needs to be accelerated to reduce the time required for the cement slurry to set at the low temperatures. However, if the set of the cement slurry is accelerated too much, it can result in an insufficient time to pump the cement slurry into the subterranean location to be cemented. It is desirable in such applications to have a long cement slurry pump time, but once the cement slurry is placed, the time required for it to set should be short. While various methods have been developed and used heretofore for delaying the release of chemical additives used in well cement slurries of the types described above, there is a continuing need for improved methods which are reliable and easily accomplished.

A variety of other well treating fluids are utilized in the construction of wells as well as in the production and stimulation of hydrocarbons therefrom. The most commonly used such treating fluids are viscous liquids of various types. For example, viscous liquids are utilized as fracturing fluids which are pumped into producing formations at rates and pressures such that fractures are created and extended therein. Propping material such as sand is typically deposited in the fractures so that they are prevented from completely closing and provide flow passages through which hydrocarbons readily flow. Viscous fluids are utilized in a number of other completion and stimulation procedures performed in wells including forming gravel packs in well bores, fracture-acidizing producing formations and the like. In order to reduce the viscosities of the viscous liquids utilized in such procedures so that the liquids can be removed, delayed viscosity breaking chemical additives must be included in the viscous liquids.

Polymeric compositions are also utilized as well treating fluids. For example, polymeric compositions have heretofore been used to reduce or terminate lost drilling fluid circulation and the undesirable flow of water or gas into or from a subterranean zone penetrated by a well bore. Such compositions are introduced into the subterranean zone to be sealed and caused to polymerize and cross-link therein whereby a stable sealing gel which reduces or terminates the undesirable fluid flow into or from the zone is formed therein. The polymeric compositions must include polymerization initiators which are delayed whereby the polymeric compositions can be pumped into the zone to be sealed before polymerization takes place.

The above described chemical additives along with a variety of others are utilized in well treating fluids, the release of which must often be delayed or otherwise controlled in order to accomplish desired results. Thus, there are continuing needs for improved methods of controlling the rates of release of chemical additives in treating fluids introduced into wells.

SUMMARY OF THE INVENTION

The present invention relates to methods of controlling the rates of release of liquid chemical additives in treating fluids introduced into wells which meet the above described needs and overcome the deficiencies of the prior art. The methods basically comprise causing a liquid chemical additive to be absorbed into a particulate porous solid material whereby the liquid chemical additive is encapsulated thereby and when the resulting encapsulated liquid chemical additive is combined with a treating fluid, the liquid chemical additive is slowly released into the treating fluid. After being encapsulated, the liquid chemical additive is combined with a treating fluid and the treating fluid containing the encapsulated liquid chemical additive is then introduced into a well.

A variety of inorganic and organic porous solid materials can be utilized in accordance with the present invention. Particularly suitable inorganic porous solid materials are those which remain dry and free flowing after absorbing liquid chemical additives therein. Examples of such porous solid materials are metal oxides, metal salts of aluminosilicates and cross-linked porous polymeric materials.

The methods of this invention are particularly suitable for controlling the rates of release of liquid chemical additives in well treating fluids utilized in completion and production stimulation procedures carried out in wells. Examples of such liquid chemical additives include, but are not limited to, cement slurry set accelerators, cement slurry set retarders, cement slurry dispersants, cement slurry suspension aids, fluid loss control additives, viscosity breaking additives, polymerization initiators and the like.

It is, therefore, a general object of the present invention to provide improved methods of controlling the rates of release of liquid chemical additives in treating fluids introduced into wells.

Other and further objects, features and advantages of the present invention will be readily apparent to those skilled in the art upon a reading of the description of preferred embodiments which follows.

DESCRIPTION OF PREFERRED EMBODIMENTS

As mentioned above, a variety of chemical additives are utilized in well treating fluids such as aqueous hydraulic cement slurries, viscous liquids utilized for stimulating hydrocarbon production from subterranean formations, viscous liquids utilized as completion fluids in wells, viscous liquids and polymeric compositions utilized to reduce or terminate the undesirable flow of fluids from or into subterranean zones, well drilling fluids and the like.

Examples of various chemical additives which are often included in aqueous hydraulic cement slurries utilized in wells include, but are not limited to, cement slurry set accelerators, cement slurry set retarders, cement slurry fluid loss control additives, cement slurry dispersants, cement permeability modifiers, cement slurry suspending agents and cement slurry thixotropy modifiers. Additives for other well treating fluids include, but are not limited to, viscosity breakers for viscous liquid treating fluids, polymerization initiators for polymeric treating fluids and activity modifiers for low temperature uses.

The present invention is based on the discovery that when a liquid chemical additive of the type described above is absorbed in and thereby encapsulated by a particulate porous solid material such as precipitated silica and the resulting encapsulated liquid chemical additive is combined with a well treating fluid, the release of the liquid chemical additive takes place at a slow rate.

The methods of the present invention for controlling the rates of release of chemical additives which are liquid or which can be dissolved in an aqueous or hydrocarbon solvent are basically comprised of first causing the liquid chemical additive to be absorbed into a particulate porous solid material whereby the liquid chemical is encapsulated thereby and when the resulting encapsulated liquid chemical additive is combined with a treating fluid, the liquid chemical additive is slowly released into the treating fluid. After being encapsulated, the liquid chemical additive is combined with a treating fluid and the treating fluid containing the encapsulated liquid additive is then introduced into a well.

While various particulate porous solid materials can be utilized in accordance with this invention, those that remain dry and free flowing after absorbing a liquid chemical additive therein are preferred. Examples of such porous solid materials include, but are not limited to, metal oxides, e.g., silica and alumina, metal salts of alumino-silicates, e.g., zeolites, clays and hydrotalcites and cross-linked porous synthetic polymeric materials, e.g., styrene-divinylbenzene based materials, cross-linked polyalkylacrylate esters and cross-linked modified starches. Of the foregoing materials, particulate porous silica is preferred with precipitated silica being the most preferred.

Precipitated silica can be prepared by adding sulfuric acid and a sodium silicate solution to water in a reaction vessel with high agitation. The mixture of acid, sodium silicate and water must be mixed at a high rate to prevent the formation of low pH areas where gelation will occur. Since silica dissolves to form silicate at a pH value above about 9, smaller particles are continuously dissolved during the precipitation process and therefore, uniform particle sizes are obtained. As the silica precipitation progresses, the small particles aggregate through siloxane bridges to form three dimensional networks that resist the high capillary pressure that develops during drying. After drying, the precipitated particulate silica is porous and remains dry and free flowing after absorbing liquids. Water based liquids are readily absorbed into porous silica. In order to absorb hydrocarbon based liquids, the porous silica can be hydrophobicized by spraying it with a uniform coating of silicon oil, i.e., polydialkylsiloxanes, followed by heating the sprayed silica to a temperature in the range of from about 300° F. to about 750° F. for a time period in the range of from about 1 hour to about 20 hours.

Particulate porous silica is commercially available from a variety of vendors and the porosity of the silica can be measured by a technique known as DBP (dibutylphthalate) absorption. In accordance with the DBP technique, the amount of dibutylphthalate that can be absorbed by porous silica while the final material remains in a dry, free flowing form is measured. Precipitated silica can absorb chemical additive solutions or pure liquids in amounts up to about 400% by weight of the precipitated silica. The absorption process can be carried out by simply spraying the solutions or pure liquids to be absorbed onto the porous solid material utilized in amounts such that the porous material remains dry after the absorption has taken place. Optionally, the solvent used in preparing such liquids can be evaporated or removed under vacuum to leave solid additives encapsulated inside the porous material.

As mentioned, a variety of liquid chemical additives can be encapsulated in accordance with this invention. Examples of liquid chemical additives for aqueous hydraulic cement slurries which can be encapsulated and utilized in accordance with the present invention include, but are not limited to, cement slurry set accelerators, cement slurry set retarders, cement slurry dispersants, cement slurry fluid loss control additives, cement slurry thixotropic additives and cement slurry suspending agents. Examples of the cement slurry set accelerators which are liquids or can be dissolved in a liquid and absorbed into porous solid materials include, but are not limited to, triethanolamine, calcium chloride, potassium chloride, sodium formate, sodium nitrate and other alkali and alkaline earth metal halides, formates, nitrates and carbonates. Examples of cement slurry set retarders which are liquids or can be dissolved in a liquid and absorbed include, but are not limited to, sodium tartrate, sodium citrate, sodium gluconate, sodium itaconate, tartaric acid, citric acid, gluconic acid, itaconic acid, lignosulfonates and synthetic polymers and copolymers. Examples of cement slurry fluid loss control additives which are liquids or can be dissolved in a liquid and absorbed include, but are not limited to, modified synthetic polymers and copolymers, natural gums and their derivatives and derivatized celluloses and starches. Examples of cement slurry dispersants which are liquids or can be dissolved in a liquid and absorbed include, but are not limited to, naphthalene-sulfonate-formaldehyde condensates, acetone-formaldehyde-sulfite condensates and glucano-delta-lactone.

As mentioned, a variety of viscous liquids are utilized in the completion and stimulation of wells. The viscosifying agents employed include natural and derivatized polysaccharides which are soluble, dispersable or swellable in an aqueous liquid to yield viscosity to the liquid. Examples of polysaccharide viscosifying agents which are commonly used include natural gums such as guar gum and modified gums such as the carboxyalkyl and hydroxyalkyl derivatives thereof. Modified celluloses and derivatives thereof are also commonly employed. The chemistry and materials involved in the preparation of polysaccharide gelled fluids is well understood in the art. Typically, the amount of gelling or viscosifying agent employed in the aqueous gel depends upon the desired viscosity. The gelling agent generally is present in an amount of from about 10 to about 120 pounds per 1,000 gallons of fluid. The aqueous gel may include a cross-linking agent to further enhance the development of viscosity by cross-linking the gelling agent. Such cross-linking agents are also well known in the art.

As mentioned, after a viscous liquid has been utilized as a treating fluid in a well, it is caused to break into a thin fluid so that it will readily flow back to the surface. The breaking of the gel is caused by the presence of a viscosity breaking chemical included in the viscous liquid. Examples of such viscosity breakers which can be encapsulated and delayedly released in accordance with this invention include, but are not limited to, aqueous solutions of enzymes such as amylase and hemicellulase, alkali and alkaline earth metal persulfate salts, inorganic and organic peroxides, organic hydroperoxides, alkali and alkaline earth metal perborates and the like.

In breaking viscous gelled aqueous liquids using aqueous solutions of viscosity breakers, e.g., enzymes, encapsulated in accordance with this invention, the release of the encapsulated breakers is considerably slowed during an initial time period in the range of from about 1 to 2 hours. Thereafter, the breakers function to fully break the gelled liquids to the same degrees as equal amounts of unencapsulated breakers. This allows higher concentrations of encapsulated breakers to be utilized than is possible with unencapsulated breakers which more fully break the gelled liquids without doing so prematurely. For example, in a producing formation fracture stimulation procedure, a highly viscous liquid carrying propping agent is utilized to create fractures and deposit the propping agent therein. If too high a concentration of an unencapsulated breaker is used, the viscous liquid breaks too soon and the propping agent is not deposited or only partially deposited in the fractures. When the breaker is encapsulated in accordance with this invention, a higher concentration of breaker can be utilized which insures the high viscosity liquid in the fractures is fully broken without risking a premature breaking of the viscous liquid.

When the treating fluid is a polymeric composition, the polymerization initiators which can be encapsulated and utilized in accordance with this invention include, but are not limited to, alkali metal persulfates, alkali metal perborates, azo initiators, organic peroxides, organic hydroperoxides and the like. Other additives which can be utilized in accordance with this invention include, but are not limited to other oxidizers and cross-linkers for polymers, gelling agents, rubber latexes and the like.

As will now be understood by those skilled in the art, any liquid chemical additive useful in well treating fluids can be encapsulated in accordance with this invention whereby the rate of release of the chemical additive into the treating fluid is controlled, i.e., caused to be delayed for a desired time period. The delayed release of a liquid chemical additive absorbed in a porous material of this invention is generally by osmosis whereby the encapsulated liquid chemical diffuses through the porous solid material as a result of it being at a higher concentration within the porous material than its concentration in the liquid treating fluid outside the porous material. In order to further delay the release of a liquid chemical additive, the porous encapsulating material can be coated with a slowly soluble coating. Examples of suitable such slowly soluble materials which can be used include, but are not limited to, EDPM rubber, polyvinyldichloride (PVDC), nylon, waxes, polyurethanes, cross-linked partially hydrolyzed acrylics and the like.

Another technique which can be utilized to delay the release of a liquid chemical additive into an aqueous treating fluid is to suspend the encapsulated liquid additive in a hydrocarbon liquid which is displaced into the subterranean formation or zone with the treating fluid into which the liquid chemical additive is to be released. The presence of the hydrocarbon liquid around the encapsulated liquid chemical additive slows its release until the encapsulated liquid chemical additive is dispersed into the aqueous treating fluid. Examples of suitable hydrocarbon liquids include, but are not limited to, diesel oil, mineral oil, kerosene and the like.

A variety of other techniques can be utilized to control the release of the encapsulated liquid chemical additive of this invention. For example, the rate of release of a particular liquid chemical additive will be dependent on the concentration of the additive in the encapsulated liquid. The higher the concentration of the encapsulated chemical additive as compared to the treating fluid surrounding it, the faster the release will take place.

If the encapsulated liquid chemical additive forms precipitates by contact with the treating fluid in which it is suspended, the initial precipitation will occur within or around the encapsulated porous material and the rate of release of the encapsulated chemical additive will depend on the solubility of the precipitated material in the treating fluid. For example, when an encapsulated solution of calcium chloride accelerator is suspended in a cement slurry, the hydroxide ions generated during hydration of the cement slurry will diffuse into the porous material containing the calcium chloride solution and form a less soluble calcium hydroxide precipitate inside or around the porous material. The further release of calcium chloride into the cement slurry will depend on the solubility of the precipitated calcium hydroxide formed in or around the remaining encapsulated calcium chloride solution.

The above described formation of less soluble calcium hydroxide precipitate and the resultant delay in the release of the encapsulated liquid chemical additive can be utilized to good advantage in certain applications. For example, in low temperature cementing applications where the cement slurry needs to be accelerated to reduce the time required for it to set after being placed, if the set time of the cement slurry is accelerated using an uncontrolled set accelerator there may not be enough pumping time to place the cement slurry in the desired subterranean location. The use of a calcium chloride set accelerator encapsulated in accordance with this invention will solve the problem. That is, the encapsulated calcium chloride solution will react with hydroxide ions generated in the cement slurry to form calcium hydroxide precipitate inside or around the encapsulating porous material. As described above, the release of the remaining calcium chloride solution will depend on the lower solubility of the precipitated calcium hydroxide which will delay the release enough to place the cement slurry in the desired location before the set of the cement slurry progresses too far.

Another application in which cement slurry set retarders encapsulated in accordance with the present invention can be utilized to advantage is as follows. In the cementing of casings or liners in well bores, the temperature at the bottom end of the well bore is often much higher than the temperature at the top of the well bore. When a string of casing is cemented in the well bore, the unset retarded cement slurry at the bottom of the well bore sets much faster than the unset retarded cement slurry at the top of the well bore. This in turn brings about a very long time period for the entire column to set whereby well completion and stimulation operations can continue. By using a set retarder encapsulated in accordance with the present invention such as a solution of tartaric acid or borate salts, the release of the set retarding chemical can be controlled so that at the high bottom well bore temperatures more retarder will be released into the cement slurry than at the low top well bore temperatures. That is, the release of the set retarding chemical by osmosis or the dissolution of less soluble precipitate is faster at higher temperatures than at lower temperatures. Thus, both the top and bottom portions of the cement columns can be made to have similar set times.

As will now be understood by those skilled in the art, a variety of techniques similar to the above examples can be utilized with the methods of the present invention to control the rates of release of liquid chemical additives utilized in well treating fluids. In order to further illustrate the methods and encapsulated liquid chemical additives of the present invention, the following further examples are given.

EXAMPLE 1

Test encapsulated cement slurry set accelerator additives were prepared in accordance with this invention. That is, various amounts of an aqueous solution of calcium chloride were absorbed into quantities of particulate porous precipitated silica. The amounts of calcium chloride in the resulting additives are given in Table I below. A test additive consisting of encapsulated pure water only was also prepared.

The test encapsulated additives as well as a quantity of unencapsulated saturated aqueous calcium chloride solution and a quantity of solid calcium chloride were added to test samples of an aqueous cement slurry comprised of Portland Class A cement and water in an amount of 43% by weight of the cement. The amounts of the various additives added to the test samples of the cement slurry are also given in Table I below.

The test samples were subjected to thickening time tests and compressive strength tests conducted in accordance with the procedures given in *API Specification For Materials And Testing For Well Cements,* API Specification 10, 5th Edition, dated Jul. 1, 1990 of the American Petroleum Institute. The results of the tests are given in Table I below.

TABLE I

Thickening Time and Compressive Strength Tests

| Description of Additive | Additive Amount, % by Weight of Cement | Calcium Chloride in Additive, % of Additive | Calcium Chloride in Cement Slurry, % by Weight of Cement | Thickening Time at 91° F. to 50 Bc, Hr:min. | Thickening Time at 91° F. to 70 Bc, Hr:min. | 6 Hour Compressive Strength at 100° F., psi | 24 Hour Compressive Strength at 100° F., psi |
|---|---|---|---|---|---|---|---|
| None | 0 | 0 | 0 | 4:03 | 4:34 | 173 | 2699 |
| Water in Porous Precipitated Silica at 1:1 Weight Ratio | 4.55 | 0 | 0 | 3:05 | 3:45 | 403 | 2810 |
| Calcium Chloride Solution in Porous Precipitated Silica at 1:1 Weight Ratio | 4.55 | 22 | 1 | 1:42 | 2:01 | 1406 | 4080 |
| Calcium Chloride Solution in Porous Precipitated Silica at 2.3:1 Weight Ratio | 3.33 | 33 | 1 | 2:10 | 2:45 | 1079 | 4080 |
| Saturated Calcium Chloride Solution | 2.27 | 44 | 1 | 1:21 | 1:21 | — | 3913 |
| Solid Calcium Chloride | 1 | 100 | 1 | 1:45 | 2:00 | 718 | 4580 |

From Table I it can be seen that the additives of the present invention increased cement slurry thickening times as compared to the same amounts of the set accelerators when added directly to the cement slurries.

EXAMPLE 2

Amylase enzyme was absorbed into porous precipitated silica to produce an encapsulated viscosity breaker. A portion of the encapsulated viscosity breaker was suspended in a slurry of diesel oil. To determine the effectiveness of the encapsulated enzyme viscosity breaker, a static break test was performed at 132° F. utilizing an aqueous cornstarch gel containing 400 pounds of cornstarch per 1,000 gallons of water. Five samples of the cornstarch gel were tested as follows. One sample contained no enzyme breaker, two of the samples contained unencapsulated liquid enzyme breaker, one sample contained an enzyme breaker encapsulated in accordance with the present invention and the final sample contained a diesel oil slurry of the encapsulated enzyme breaker of this invention. After adding the various amylase enzyme breakers to the cornstarch gel samples, the viscosities of the samples were measured and measured again every half hour thereafter up to 2 hours and then again at 16 hours. The results of these tests are given in Table II below.

TABLE II

Aqueous Cornstarch Gel Break Tests

| Sample No. | Breaker | Time: 0 | Viscosity[1], cp | | | | |
|---|---|---|---|---|---|---|---|
| | | | 0.5 hr. | 1 hr. | 1.5 hr. | 2 hr. | 16 hrs. |
| 1 | None | 90 | 75 | 75 | 71 | 71 | 66 |
| 2 | .000125 gallon of liquid amylase per 1,000 gallons cornstarch gel | 90 | 66 | 60 | 53 | 53 | 10 |
| 3 | 0.00025 gallon of liquid amylase per 1,000 gallons cornstarch gel | 90 | 55 | 51 | 46 | 41 | 4.5 |
| 4 | porous silica encapsulated liquid amylase (0.00025 gallon amylase per 1,000 gallons of cornstarch gel) | 90 | 73 | 61 | 55 | 47 | 4 |

TABLE II-continued

Aqueous Cornstarch Gel Break Tests

| Sample No. | Breaker | Time: | Viscosity[1], cp | | | | |
|---|---|---|---|---|---|---|---|
| | | | 0 | 0.5 hr. | 1 hr. | 1.5 hr. | 2 hr. | 16 hrs. |
| 5 | porous silica encapsulated liquid amylase slurried in diesel oil (0.0002 gallon amylase per 1,000 gallons of cornstarch gel) | | 90 | 73 | 69 | 62 | 55 | 6 |

[1]Fann Model 35 Viscometer @ 300 rpm

From Table II it can be seen that the samples containing unencapsulated liquid amylase breaker (Samples 2 and 3) showed significant reduction of gel viscosity during the test period. Both of the samples containing porous silica encapsulated breaker (Samples 4 and 5) had slower break rates than the samples containing unencapsulated breaker during the first 2 hours of the test. However, after 16 hours, the viscosities are similar for the unencapsulated and encapsulated breakers. Thus, the encapsulated breaker of this invention allows complete breakdown of the gel after a period of time, but controls the early time release whereby more breaker can be used. Sample 5 which included encapsulated breaker slurried in diesel oil had a slower break rate than Sample 4.

EXAMPLE 3

Hemicellulase enzyme was absorbed into porous precipitated silica to form an encapsulated viscosity breaker. To determine the effectiveness of the breaker, a static break test was performed at 120° F. using an aqueous guar gum gel having a concentration of guar gum therein of 75 pounds of guar gum per 1,000 gallons of gel. Three samples of the gel were tested. One sample contained no breaker, one sample contained unencapsulated liquid hemicellulase and one sample contained hemicellulase encapsulated in accordance with the present invention. After adding the various breakers to the guar gel samples, the viscosities of the gel samples were measured and measured again every hour thereafter up to 3 hours and again at 19 hours. The results of these tests are set forth in Table III below.

TABLE III

Aqueous Guar Gel Break Tests

| Sample No. | Breaker | Time: | Viscosity[1], cp | | | | |
|---|---|---|---|---|---|---|---|
| | | | 0 | 1 | 2 | 3 | 19 |
| 1 | None | | 104 | 91 | 91 | 91 | 91 |
| 2 | 0.05 gallon of liquid hemicellulase per 1,000 gallons of guar gel | | 104 | 67.5 | 49 | 32.5 | 3 |
| 3 | porous silica encapsulated liquid hemicellulase (0.05 gallon of liquid hemicellulase per 1,000 gallons of guar gel) | | 104 | 87 | 80 | 75 | 20 |

[1]Fann Model 35 Viscometer @ 300 rpm

As can be seen from Table III, the sample with no breaker degraded to a viscosity of 91 centipoises over a period of time of 19 hours at 120° F. The sample containing the unencapsulated liquid hemicellulase showed significant reduction in viscosity over the test period. The sample containing the liquid hemicellulase encapsulated in accordance with the present invention showed a slower break rate than the sample containing unencapsulated liquid hemicellulase in the first three hours of the test. However, after 19 hours, significant reduction in viscosity was observed for the gel containing the encapsulated liquid hemicellulase. Thus, the liquid hemicellulase enzyme encapsulated in accordance with the present invention was slowly released during the first 3 hours, but at the end of 19 hours a full release of the enzyme had taken place which produced a full reduction in viscosity. This allows a higher concentration of breaker to be used as compared to when the release of the breaker is not controlled.

EXAMPLE 4

A 50% by weight aqueous solution of sodium persulfate was absorbed into porous precipitated silica to form an encapsulated viscosity breaker. To determine the effectiveness of the breaker, a static break test was performed at 80° F. using an aqueous hydroxyethylcellulose (HEC) gel having a concentration of HEC therein of 80 pounds of HEC per 1,000 gallons of water. Three samples of the HEC gel were tested. One sample contained unencapsulated sodium persulfate powder in an amount of 0.12 grams per 250 milliliters of gel, one sample contained a mixture of unencapsulated sodium persulfate powder and triethanolamine in an amount of 0.12 grams of sodium persulfate and 0.25 milliliters of triethanolamine per 250 milliliters of gel and one sample contained a mixture of the above mentioned encapsulated solution of sodium persulfate and triethanolamine in an amount of 0.12 grams of sodium persulfate (powder) and 0.25 milliliters of triethanolamine. After adding the various breakers to the HEC gel samples, the viscosities of the gel samples were measured and measured again every hour thereafter up to 4 hours and again at 6 and 24 hours. The results of these tests are set forth in Table IV below.

TABLE IV

Aqueous Hydroxyethylcellulose Gel Break Tests

| Sample No. | Breaker | Time: | Viscosity[1], cp | | | | | | |
|---|---|---|---|---|---|---|---|---|---|
| | | | 0 | 1 | 2 | 3 | 4 | 6 | 24 |
| 1 | unencapsulated sodium persulfate powder | | 151 | 147 | 146 | 141 | 137 | 127 | 70 |
| 2 | mixture of unencapsulated sodium persulfate powder and triethanolamine | | 149 | 125 | 89 | 56 | 43 | 29 | 11 |
| 3 | mixture of encapsulated sodium persulfate and triethanolamine | | 150 | 131 | — | 82 | 65 | — | 28 |

[1]Fann Model 35 Viscometer @ 300 rpm

From Table IV it can be seen that the encapsulated additive of the present invention delayed the breaking of the viscous hydroxyethylcellulose gel.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of controlling the rate of release of a liquid chemical additive in a treating fluid introduced into a well comprising the steps of:

(a) causing said liquid chemical additive to be absorbed into a porous solid material whereby said liquid chemical is encapsulated thereby and when the resulting encapsulated liquid chemical additive is combined with said treating fluid said liquid chemical additive is slowly released into said treating fluid, said porous solid material being a particulate material which remains dry and free flowing after absorbing a liquid chemical additive therein selected from the group consisting of silica, alumina, metal salts of aluminosilicates, clays, hydrotalcite, styrene-divinylbenzene based materials, cross-linked polyalkylacrylate esters and cross-linked modified starches;

(b) combining said encapsulated liquid chemical additive with said treating fluid; and (c) introducing said treating fluid containing said encapsulated liquid chemical additive into said well.

2. The method of claim 1 wherein said treating fluid is a polymeric composition and said liquid chemical additive is comprised of a polymerization initiator selected from the group of alkali metal persulfates, alkali and alkaline earth metal perborates, azo initiators, organic peroxides and organic hydroperoxides.

3. The method of claim 1 wherein said treating fluid is a viscous liquid and said liquid chemical additive is comprised of a viscosity breaker selected from the group of enzymes, inorganic and organic peroxides, organic hydroperoxides and alkali and alkaline earth metal perborates.

4. The method of claim 1 wherein step (a) further comprises coating said encapsulated liquid chemical additive with a slowly soluble material to thereby further slow the release of said liquid chemical additive into said treating fluid.

5. The method of claim 4 wherein said slowly soluble material is a polymeric material selected from the group of EDPM rubber, polyvinyldichloride (PVDC), nylon, waxes, polyurethanes and cross-linked partially hydrolyzed acrylics.

6. The method of claim 1 wherein step (a) further comprises suspending said encapsulated liquid chemical additive in a hydrocarbon liquid to thereby further slow the release of said liquid chemical additive into said treating fluid.

7. The method of claim 6 wherein said hydrocarbon liquid is selected from the group of diesel oil, mineral oil and kerosene.

8. A method of controlling the rate of release of a liquid chemical additive in a treating fluid introduced into a well comprising the steps of:

(a) causing said liquid chemical additive to be absorbed into a porous solid material whereby said liquid chemical additive is encapsulated thereby and when the resulting encapsulated liquid chemical additive is combined with said treating fluid said liquid chemical additive is slowly released into said treating fluid, said porous solid material being precipitated silica which remains dry and free flowing after absorbing a liquid chemical additive therein;

(b) combining said encapsulated liquid chemical additive with said treating fluid; and (c) introducing said treating fluid containing said encapsulated liquid chemical additive into said well.

9. The method of claim 8 wherein said treating fluid is a cement slurry and said liquid chemical additive is selected from the group of cement slurry set accelerators, cement slurry set retarders, cement slurry fluid loss control additives, cement slurry dispersants, cement slurry thixotropic additives and cement slurry suspending agents.

10. The method of claim 8 wherein said treating fluid is a cement slurry and said liquid chemical additive is comprised of a cement slurry set accelerator selected from the group of triethanolamines, calcium chloride, potassium chloride, sodium formate, sodium nitrate, and other alkali and alkaline earth metal halides, formates, nitrates and carbonates.

11. The method of claim 8 wherein said treating fluid is a cement slurry and said liquid chemical additive is comprised of a cement slurry set retarder selected from the group of sodium tartrate, sodium citrate, sodium gluconate, sodium itaconate, tartaric acid, citric acid, gluconic acid, lignosulfonates and synthetic polymers and copolymers.

12. The method of claim 8 wherein said treating fluid is a cement slurry and said liquid chemical additive is comprised of a cement slurry fluid loss control additive selected from the group of modified synthetic polymers and copolymers, natural gums and their derivatives, derivatized cellulose and starches.

13. The method of claim 8 wherein said treating fluid is a cement slurry and said liquid chemical additive is comprised of a cement slurry dispersant selected from the group of naphthalene-sulfonate-formaldehyde condensates, acetone-formaldehyde-sulfite condensates and glucano-delta-lactone.

14. The method of claim 8 wherein said porous solid material is porous silica and said liquid chemical additive is caused to be absorbed therein in accordance with step (a) in an amount in the range of from about 100% to about 400% by weight of said porous silica.

15. A method of controlling the rate of release of a liquid chemical additive in a treating fluid selected from the group of cement slurries, polymeric compositions, viscous aqueous liquids, viscous non-aqueous liquids and well drilling fluids introduced into a well comprising the steps of:

(a) causing said liquid chemical additive to be absorbed into a particulate porous solid material which remains dry and free flowing after absorbing said liquid chemical additive whereby said liquid chemical additive is encapsulated by said porous solid material and when the resulting encapsulated liquid chemical additive is combined with said treating fluid said liquid chemical additive is slowly released into said treating fluid, said particulate porous solid material being selected from the group consisting of precipitated silica, alumina, zeolites, clays, hydrotalcite, styrene-divinylbenzene based materials, cross-linked polyalkylacrylate esters and cross-linked modified starch;

(b) combining said encapsulated liquid chemical additive with said treating fluid; and (c) introducing said treating fluid containing said encapsulated liquid chemical additive into said well.

16. The method of claim 15 wherein said liquid chemical additive is selected from the group of cement slurry set accelerators, cement slurry set retarders, cement slurry fluid loss control additives, cement slurry dispersants, cement slurry thixotropic additives, cement slurry suspending agents, polymerization initiators, viscosity breakers, cross-linkers and oxidizers.

17. The method of claim 16 wherein step (a) further comprises coating said encapsulated liquid chemical additive with a slowly soluble material to thereby further slow the release of said liquid chemical additive into said treating fluid.

18. The method of claim 17 wherein said slowly soluble material is a polymeric material selected from the group of EDPM rubber, polyvinyldichloride (PVDC), nylon, waxes, polyurethanes and cross-linked partially hydrolyzed acrylics.

19. The method of claim 16 wherein step (a) further comprises suspending said encapsulated liquid chemical additive in a hydrocarbon liquid to thereby further slow the release of said liquid chemical additive into said treating fluid.

20. The method of claim 19 wherein said hydrocarbon liquid is selected from the group of diesel oil, mineral oil and kerosene.

21. A method of controlling the rate of release of a liquid chemical additive in a cement slurry introduced into a well comprising the steps of:

(a) causing said liquid chemical additive to be absorbed into particulate porous silica whereby said liquid chemical additive is encapsulated thereby and when the resulting encapsulated liquid chemical additive is combined with said cement slurry, said liquid chemical additive is slowly released into said cement slurry;

(b) combining said encapsulated liquid chemical additive with said cement slurry; and (c) introducing said cement slurry containing said encapsulated liquid chemical additive into said well.

22. The method of claim 21 wherein said liquid chemical additive is selected from the group of cement slurry set accelerators, cement slurry set retarders, cement slurry fluid loss control additives, cement slurry dispersants, cement slurry thixotropic additives and cement slurry suspending agents.

23. The method of claim 22 wherein step (a) further comprises coating said encapsulated liquid chemical additive with a slowly soluble material to thereby further slow the release of said liquid chemical additive into said treating fluid.

24. The method of claim 23 wherein said slowly soluble material is a polymeric material selected from the group of EDPM rubber, polyvinyldichloride (PVDC), nylon, waxes, polyurethanes and cross-linked partially hydrolyzed acrylics.

25. The method of claim 22 wherein step (a) further comprises suspending said encapsulated liquid chemical additive in a hydrocarbon liquid to thereby further slow the release of said liquid chemical additive into said treating fluid.

26. The method of claim 25 wherein said hydrocarbon liquid is selected from the group of diesel oil, mineral oil and kerosene.

* * * * *